No. 869,816. PATENTED OCT. 29, 1907.
A. E. VROOMAN.
VEGETABLE TOPPING MACHINE.
APPLICATION FILED MAY 10, 1906.
2 SHEETS—SHEET 1.
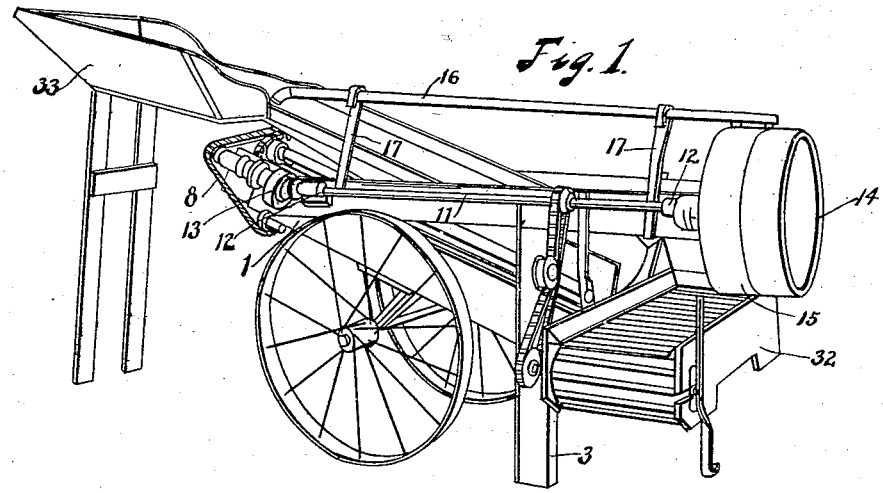
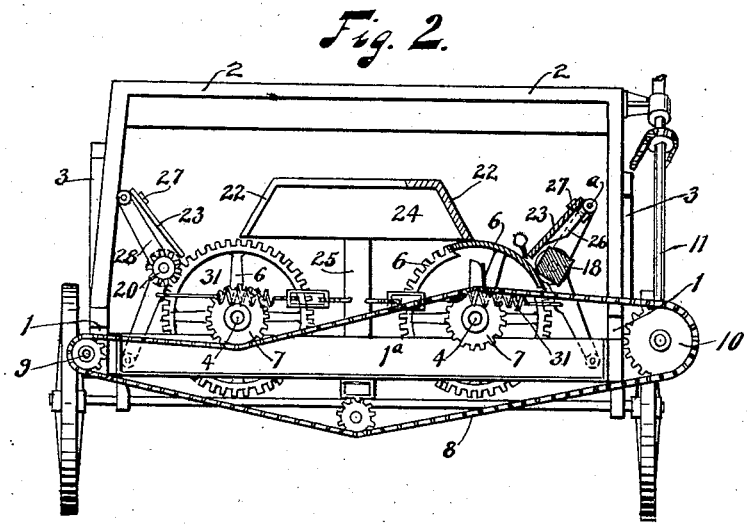
Witnesses:
Edw. Lindmueller.
Nettie M. Malle.
Inventor:
Arba E. Vrooman
By Obed C. Billman
His Attorney.

No. 869,816.  
PATENTED OCT. 29, 1907.  
A. E. VROOMAN.  
VEGETABLE TOPPING MACHINE.  
APPLICATION FILED MAY 10, 1906.  
2 SHEETS—SHEET 2.
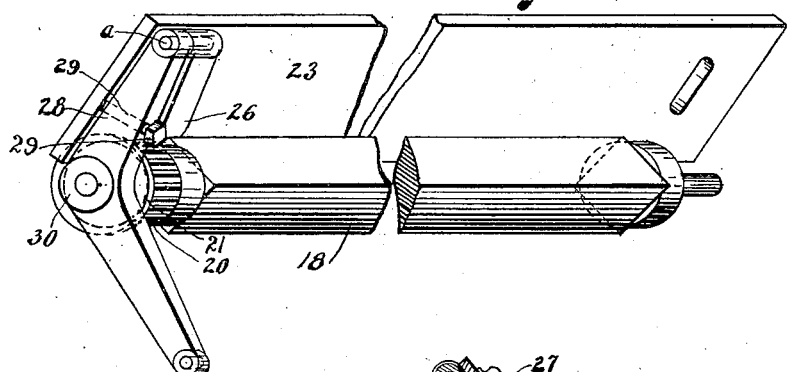
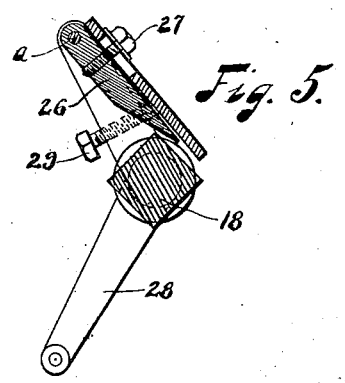
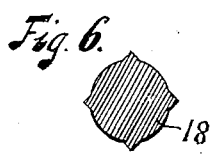
Witnesses:  
Edw. Lindmueller.  
Nettie M. Malle.
Inventor:  
Arba E. Vrooman  
By Obed C. Billman  
His Attorney.

UNITED STATES PATENT OFFICE.

ARBA E. VROOMAN, OF PAINESVILLE, OHIO

VEGETABLE-TOPPING MACHINE.

No. 869,816.    Specification of Letters Patent.    Patented Oct. 29, 1907.

Original application filed November 3, 1902, Serial No. 129,833. Divided and this application filed May 10, 1906.
Serial No. 316,108.

*To all whom it may concern:*

Be it known that I, ARBA E. VROOMAN, a citizen of the United States, residing at Painesville, in the county of Lake and State of Ohio, have invented certain new and useful Improvements in Vegetable-Topping Machines, of which the following is a specification.

My invention relates to improvements in vegetable-topping-machines, and is especially designed for the removal of tops from onions and other or similar vegetables.

The invention relates particularly to improvements in machines of this class disclosed in Patent Number 580,742, issued to Arba E. & Warren F. Vrooman, Apr. 13, 1897, "Onion-topper", and Patent Number 676,549, issued to Arba E. Vrooman, June 18, 1901, for "Vegetable-topping-machine".

My improvements are particularly set forth in an application for Letters Patent for vegetable-topping-machines, filed Nov. 3, 1902, Serial Number 129,833, of which this application is a divisional part.

Experienced growers of onions find that the same should not all be topped of the same length, but that the length of stem remaining on the onion should be in proportion to the size of the vegetable, for two reasons, viz: First: They have a better appearance for market. Second: If a sufficient length of stem is not left on the onion, the air gets into the bulb of the same and causes it to grow and rot.

The object of my invention, therefore, is to provide a generally improved machine of this class which will expeditiously and cleanly remove the tops from the vegetables without bruising or otherwise injuring them, and which will, at the same time, top the large and small vegetables in such a manner that the length of the stem left remaining on the vegetable will be in exact proportion to the size of the same.

Another object of the invention is to construct a machine for the purpose described, which will be exceedingly perfect, simple, durable, and economic, and in which the various parts of the machine requisite for the work may be expeditiously and conveniently adjusted to meet all requirements.

With these ends in view, the invention consists in the novel construction, arrangement, and combination of parts hereinafter described, illustrated in the accompanying drawings, and particularly pointed out in the appended claims.

Referring now to the drawings forming a part of this specification, Figure 1, is a perspective view of a double feed cylinder machine constructed in accordance with my invention and adapted to be driven by any suitable source of power. Fig. 2, a front elevation of the same, partly in section, having the feeding hopper removed and tipped on its axle for transportation. Fig. 3, a detailed view of the revoluble feeding-cylinder and cutting-bar. Fig. 4, a detailed perspective view of the revoluble cutting-bar and attached adjustably mounted side wall. Fig. 5, a cross sectional view of the same. Fig. 6, a modified form of a revoluble cutting-bar.

Similar numerals of reference designate like parts throughout all the figures of the drawings.

The inclined main frame 1, of the machine is mounted, in the present instance, on wheels as shown, by means of which, together with a removable tongue (not shown in the drawings) secured to the front end of the machine, the machine may be transported from place to place by tilting the same on its axle to the position shown in Fig. 2, of the drawings. The upper horizontal frame 2, has its front end meeting with and secured to the inclined main frame, near the front end thereof and is secured to the rear end of the main frame by means of upright supporting-arms or legs 3, by means of which legs the machine is supported in its normal operative position, as shown in Fig. 1, of the drawings. To the front and rear angle irons or ends $1^a$, of the inclined main frame 1, a pair of main driving shafts 4, carrying revoluble feeding-cylinders 5, are mounted in suitable bearings.

Mounted within the ends of said revoluble feeding-cylinders 5, and secured thereto, in any suitable and convenient manner, are front and rear driving wheels 6, secured to the main driving shafts 4, of said feeding-cylinders 5, and said front driving wheels are provided with gearing for the purpose of enabling them to impart motion to the parts hereinafter described.

Sprocket wheels 7, are secured to the front ends of the main driving shafts 4, to which motion is imparted by means of a sprocket chain 8, passing over the same and over an idle wheel 9, suitably mounted and attached to the side of the frame of the machine and thence over a sprocket wheel 10, attached to the main driving shaft 11, mounted in suitable bearings 12, at the side of the frame of the machine.

The main driving shaft 11, consists of two parts connected by means of a universal joint 13, and to one end of one of said parts are secured a main driving pulley 14, and loose pulley 15. The pulleys 14 and 15, are driven with a suitable belting communicating with a suitable source of power and a shifting-bar 16, for shifting the belting from the loose pulley 15, to the main driving pulley 14, and vice versa is slidably mounted in brackets 17, attached at their lower ends to the side of the horizontal frame 2. If desired, the source of power such as an engine, motor or the like, may be mounted on an extended end of the main frame and attached directly to the main driving shaft thus eliminating the belting.

A revoluble cutting-bar 18, is provided at its ends with a round collar 19, adapted to transform the ends of the revoluble square cutting-bar to nearly a round form, the diameter of which round form is slightly less than the diameter of the square form when measured from corner to corner diagonally, and a suitable difference would be to have the round collars on each end of the square cutter about one-quarter of an inch less in diameter than the diameter of the square cutter across from one corner to the opposite corner. To the upper or front end of the revoluble cutting-bar 18, is secured a pinion 20, which may be provided with a flange 21, as shown most clearly in Fig. 3, of the drawings.

Side walls 22, and 23, forming a vegetable-trough are mounted parallel with and in close proximity to the inclined revoluble feeding-cylinder 5, and are adapted to properly feed and convey the vegetables along the inclined revoluble feeding-cylinder and cutting-bar in such a manner that the tops, presented to the cutting-edges of the revoluble cutting-bar 18, will be cut of such a length that the stem left on the vegetables will be in exact proportion to the size of the vegetables. It will be understood that the vegetables will be topped in proportion to their size by reason of the fact that a small vegetable will be carried farther down into the channel or V-shaped groove formed by the side wall 23 and the revoluble feeding-cylinder 5, while a larger vegetable will have its top severed a greater distance from its bulb by reason of the fact that the sides of the bulb will come into contact with the feeding-cylinder and side wall a greater distance up in the V-shaped channel of the trough. The length of stem left on the vegetables may be further regulated by increasing or decreasing the opening wherethrough the vegetable tops are carried along the free edge of the side wall 23, by moving said free or lower edge of side wall vertically and laterally to and from the revoluble feeding-cylinder and cutting-bar by the mechanism hereinafter described. The side walls 22, of the vegetable-trough are stationary and are securely attached at their ends to the front and rear ends of the inclined main frame, being secured at the front ends thereof by means of the end walls 24, and upright bars 25. The side walls 23, are movably and adjustably mounted and attached at their ends to a block or arm 26, (see Figs. 4, and 5,) by means of an adjusting bolt 27, passing through a vertical slot in said side walls and into said blocks 26. The blocks 26, are pivotally attached at their upper ends, as at $a$ to the upper ends of supporting-arms 28, and said supporting-arms are pivotally attached at their lower ends in a suitable manner to the ends of the main frame of the machine. Adjusting bolts 29, pass through the supporting-arms 28, and have their inner ends resting against the rear side of the movable side wall 23, by means of which the same may be moved to and from the revoluble cutting-bar. By means of adjusting bolts 27, the side walls 23, may be moved to and from the revoluble feeding-cylinders whereby to regulate the opening wherethrough the vegetable tops are carried by the feeding-cylinder.

The ends of the cutting-bars 18, are journaled in the supporting-arms 28, as at 30, and in order to elastically hold said cutting-bars to their work and keep the pinions 20 of the same in mesh with the gearings of the drive wheels 6, springs 31, are secured at one end to the supporting-arms 28, and at the other, to the upright bars 25, as shown in Fig. 2, of the drawings. By this arrangement, it will be seen that the cutting-bars 18, will be elastically held in contact with the feeding-cylinder 5, and that, as motion is being imparted to the cutting-bars 18, they will give a slightly vibratory motion to the cutting edges (they being further from the center of the cutting-bar than the peripheries of the collars) as they are thrown into and out of contact or engagement with the feeding-cylinders 5. A simultaneous motion will also be given to the side walls 23, attached to the upper ends of the supporting-arms 28. Furthermore, by this arrangement, should a stone or other hard foreign substance be brought between the cutting edges of the cutting-bar 18, and the feeding-cylinder 5, the spring 31, will allow the pinion 20, to be thrown out of mesh with the gearing of the drive wheel 6, and thus no harm will result to the machine.

32, designates an endless carrier and sorter for sorting and carrying away the topped vegetables after they have fallen from the lower ends of the feeding-cylinders 5.

A feeding hopper 33, mounted at the front end of the machine, is designed to feed the vegetables to the various feeding-cylinders. The vegetables pass from the feeding hopper to the upper ends of the feeding-cylinders and are assisted in their downward course by gravity, the revolution of the feeding-cylinders and the agitation of the vibrating side walls 23. As the vegetables pass downward, the feeding-cylinders carry them against the vibrating side walls of the trough and the tops are drawn under the sides of the troughs and under the revoluble cutting-bars 18. The tops are thus severed from the vegetables, the latter passing downward and falling upon the endless carrier leading to the desired place of deposit. In a trough of this form the vegetables will be caused to revolve over and over a number of times in their progress along the trough and in a much more effective manner than with the "baffle strips or ribs 39", placed transversely along the side of the trough as shown and described in Patent No. 580,742, issued to Arba. E. Vrooman and Warren F. Vrooman, April 13, 1897. In this form of trough it is evident that the vegetables will assume the proper position at nearly every revolution, thus insuring the tops entering the opening at the bottom of the trough and increasing the capacity of the machine by positioning the vegetables quickly so that the tops will enter between the feeding-roll and revoluble cutting-bar, and the tops then being removed, the vegetables are free to roll out of the way and clear the trough for those following.

Having thus explained the nature of the invention and described a way of constructing and using the same, I declare that what I claim is,—

1. In a machine for topping vegetables, the combination with a revoluble feeding-cylinder, and a revoluble cutting-bar; of a side wall pivotally mounted and having its lower or free edge above the meeting perimeters of said feeding-cylinder and cutting-bar, arms for supporting said side wall and cutting-bar, and means carried by said arms whereby the free edge of said side wall may be moved vertically and transversely to and from said revoluble feeding-cylinder and cutting-bar.

2. A vegetable-topping-machine, comprising an inclined revoluble feeding-cylinder, a revoluble cutting-bar, a pair of pivotally-mounted spring-resisted angled supporting-arms having their angled portions extending toward said feeding-cylinder and provided with bearings carrying said revoluble cutting-bar, a pair of blocks pivotally attached at one end to the free ends of said supporting-arms, a side wall slidably and adjustably-secured to said pair of blocks carried by said supporting-arms and having its lower or free edge above the meeting perimeters of said feeding-cylinder and cutting-bar, and means carried by said blocks whereby said side wall may be moved to and from said revoluble feeding-cylinder.

3. In a machine for topping vegetables, the combination with a stationary revoluble feeding-cylinder and a revoluble cutting-roll movably yieldingly mounted against said feeding-cylinder; of a stationary side wall or board mounted above said feeding cylinder, a movable side wall or board adjustably mounted with said cutting-roll and forming with said stationary side wall a vegetable supporting-trough, and collars, of less diameter than the cutting-edge diameter of said cutting-roll, for imparting a simultaneous vibratory motion to said cutting-roll and said movable side wall or board as said cutting edges are thrown into and out of engagement with said feeding-cylinder.

4. In a vegetable-topping machine, the combination with a revoluble feeding-cylinder, and a pair of pivotally-mounted spring-resisted bell-crank supporting-arms having their angled portions extending toward said feeding-cylinder and carrying a revoluble cutting-roll; of a pair of supporting-blocks pivotally attached to the free ends of said supporting arms, a side wall carried by said supporting-blocks and adjustably-secured thereto by means of adjusting-bolts passing through slots in said side wall and into said blocks, and adjusting-bolts mounted in said supporting-arms and resting against said side wall by means of which the free edge of the same may be moved to and from said cutting-roll.

5. In a machine for topping vegetables, the combination with an inclined revoluble feeding-cylinder and cutting-bar; of a side wall parallel to said feeding-cylinder and having its lower edge supported above the meeting perimeters of said feeding-cylinder and cutting-bar, supporting-arms suitably mounted and carrying said cutting-bar and said side wall, and adjusting-bolts carried by said supporting-arms whereby the lower edge of said side wall may be moved laterally to and from said feeding-cylinder and cutting-bar.

6. In a vegetable-topping-machine, the combination with a revoluble feeding-cylinder; of a cutting-bar and side wall yieldingly mounted parallel and in close proximity to said revoluble feeding-cylinder, means whereby the lower edge of said side wall may be moved vertically and laterally to and from said feeding cylinder and cutting-bar, and collars for transforming the ends of said cutting-bar to a round form.

7. In a vegetable-topping-machine, the combination with an inclined revoluble feeding-cylinder and a stationary side wall; of a movable cutting-bar and side wall yieldingly mounted parallel to said feeding-cylinder, bell-crank supporting-arms suitably mounted and carrying said cutting-bar and side wall, and means carried by said supporting-arms whereby the lower edge of said side wall may be moved vertically and laterally to and from said feeding-cylinder.

8. In a vegetable-topping-machine, a pair of pivotally-mounted spring-resisted angled supporting-arms having their angled portions extending towards the feeding-cylinder and provided with bearings carrying a revoluble cutting-bar, a movable side board secured to the free ends of said supporting-arms, and means carried by said supporting-arms whereby the free edge of said side board may be moved to and from said cutting-bar.

9. In a vegetable-topping-machine, the combination with a frame, and an inclined feeding-cylinder; of a cutting-roll, and a pair of spring-resisted bell-crank arms provided with bearings at their intermediate portions for the ends of said cutting-roll, one of the arms of said bell-cranks extending outwardly and downwardly from said feeding-cylinder and being pivotally mounted, and the other extending upwardly and outwardly and carrying a pivotally-mounted similarly-inclined side wall having its free end adjustably-mounted above the meeting perimeters of said feeding-cylinder and cutting-roll.

10. In a vegetable-topping-machine, the combination with an inclined feeding-cylinder mounted on a suitable frame; of a similarly-inclined cutting-bar engaging said cylinder, and a pair of spring-resisted bell-cranks provided with bearings for said cutting-bar, one of the arms of said bell-cranks leading downwardly and outwardly from said feeding-cylinder and cutting-bar and pivotally-secured to said frame and the other or free end being inclined outwardly and upwardly and carrying a similarly inclined adjustably-mounted side board.

In testimony whereof I have signed my name to this specification in the presence of two subscribing witnesses.

ARBA E. VROOMAN.

Witnesses:
O. C. BILLMAN,
NETTIE M. MALLE.